(12) United States Patent
Van Den Hamer et al.

(10) Patent No.: US 8,335,958 B2
(45) Date of Patent: Dec. 18, 2012

(54) METHOD OF COMMUNICATION, IN PARTICULAR WITH CAPABILITY OF FRAME ABORTION OR RETRANSMISSION INDICATION, BETWEEN A TRANSMITTER AND A RECEIVER BASED ON FRAMES AND CORRESPONDING COMMUNICATION NODE

(75) Inventors: Peter Van Den Hamer, Waalre (NL); Andrei Radulescu, Eindhoven (NL)

(73) Assignee: ST-Ericsson SA, Plan-Les-Ouates (CH)

( * ) Notice: Subject to any disclaimer, the term of this patent is extended or adjusted under 35 U.S.C. 154(b) by 67 days.

(21) Appl. No.: 12/735,436

(22) PCT Filed: Jan. 16, 2009

(86) PCT No.: PCT/EP2009/050517
§ 371 (c)(1),
(2), (4) Date: Oct. 8, 2010

(87) PCT Pub. No.: WO2009/090255
PCT Pub. Date: Jul. 23, 2009

(65) Prior Publication Data
US 2011/0041025 A1 Feb. 17, 2011

(30) Foreign Application Priority Data
Jan. 18, 2008 (EP) .................................... 08100649

(51) Int. Cl.
*G08C 25/02* (2006.01)
(52) U.S. Cl. ........................................ 714/748; 714/749
(58) Field of Classification Search .................. 714/748, 714/749
See application file for complete search history.

(56) References Cited

U.S. PATENT DOCUMENTS
4,241,398 A    12/1980  Carll
(Continued)

FOREIGN PATENT DOCUMENTS
EP        0 801 483 A2    10/1997
(Continued)

OTHER PUBLICATIONS

International Search Report dated Nov. 5, 2009 in connection with PCT Patent Application No. PCT/EP2009/050517.
(Continued)

*Primary Examiner* — Yolanda L Wilson
(74) *Attorney, Agent, or Firm* — Coats & Bennett, P.L.L.C.

(57) ABSTRACT

A method of communicating between a transmitter and a receiver based on frames is provided. An error detection code is added to each frame to be transmitted by the transmitter. The frames to be transmitted by the transmitter are transmitted and the transmitted frames are received by the receiver. An error detection code is re-computed based on the received frames by the receiver. At least one frame which has been correctly received based on a comparison of the error detection code of each frame with the re-computed error detection code of each received frame is acknowledged. An error indication frame is sent by the receiver when an error is detected based on the comparison result. If a retransmission condition is detected by the transmitter by receiving an error indication frame from the receiver or if no acknowledgement frame was received by the transmitter from the receiver in a predetermined time interval, the currently transmitted frame is aborted and the transmitter inserts a trailer. As a further possibility instead of inserting a trailer, the start of re-transmission can be indicated by using a retransmission indicator.

15 Claims, 6 Drawing Sheets

U.S. PATENT DOCUMENTS

| | | | |
|---|---|---|---|
| 5,717,689 A * | 2/1998 | Ayanoglu | 370/349 |
| 5,896,402 A * | 4/1999 | Kurobe et al. | 714/748 |
| 6,014,765 A * | 1/2000 | Maeda et al. | 714/748 |
| 6,345,375 B1 * | 2/2002 | Kelkar et al. | 714/748 |
| 6,522,650 B1 * | 2/2003 | Yonge et al. | 370/390 |
| 6,728,921 B1 * | 4/2004 | Bentall et al. | 714/758 |
| 7,650,560 B2 * | 1/2010 | Mo et al. | 714/790 |
| 2005/0229071 A1 * | 10/2005 | Uga | 714/748 |
| 2006/0034326 A1 | 2/2006 | Anderson et al. | |
| 2006/0168273 A1 | 7/2006 | Michael | |
| 2007/0162813 A1 * | 7/2007 | Nakashima | 714/749 |
| 2007/0174608 A1 * | 7/2007 | Balandin et al. | 713/155 |
| 2010/0131817 A1 * | 5/2010 | Kong et al. | 714/749 |

FOREIGN PATENT DOCUMENTS

| | | |
|---|---|---|
| EP | 1 589 704 A2 | 10/2005 |
| WO | WO 2008/007859 A1 | 1/2008 |

OTHER PUBLICATIONS

Written Opinion of the International Searching Authority dated Nov. 5, 2009 in connection with PCT Patent Application No. PCT/EP2009/050517.

* cited by examiner

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1 | ESC_DL ||||||||  CTRL_ID=SOF ||| TC ||  R ||
| 0 | L2 payload ||||||||||||||||
| 0 | L2 payload ||||||||||||||||
| 0 | L2 payload ||||||||||||||||
| 1 | ESC_DL ||||||||  CTRL_ID=EOF ||| FSN ||||
| 0 | CRC16 ||||||||||||||||

Fig.1

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1 | ESC_DL ||||||||  CTRL_ID=AFC ||| TC || Req | R ||
| 0 | FSN |||| R ||| CV |||||||||
| 0 | CRC16 ||||||||||||||||

Fig.2

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1 | ESC_DL ||||||||  CTRL_ID=NAC ||| TC0 | FSN |||
| 0 | FSN |||| R |||||||| RB | RRR |
| 0 | CRC16 ||||||||||||||||

Fig.3

| 16 | 15 | 14 | 13 | 12 | 11 | 10 | 9 | 8 | 7 | 6 | 5 | 4 | 3 | 2 | 1 | 0 |
|----|----|----|----|----|----|----|---|---|---|---|---|---|---|---|---|---|
| 1 | ESC_DL ||||||||  CTRL_ID=AFC ||| TC || Req | RB | Res |
| 0 | FSN |||| R ||| CV |||||||||
| 0 | CRC16 ||||||||||||||||

Fig.4

METHOD OF COMMUNICATION, IN PARTICULAR WITH CAPABILITY OF FRAME ABORTION OR RETRANSMISSION INDICATION, BETWEEN A TRANSMITTER AND A RECEIVER BASED ON FRAMES AND CORRESPONDING COMMUNICATION NODE

CROSS-REFERENCE TO RELATED APPLICATION(S)

The present application claims priority under 35 U.S.C. §365 to International Patent Application No. PCT/EP2009/050517 filed Jan. 16, 2009, entitled "METHOD OF COMMUNICATION, IN PARTICULAR WITH CAPABILITY OF FRAME ABORTION OR RETRANSMISSION INDICATION, BETWEEN A TRANSMITTER AND A RECEIVER BASED ON FRAMES AND CORRESPONDING COMMUNICATION NODE". International Patent Application No. PCT/EP2009/050517 claims priority under 35 U.S.C. §365 and/or 35 U.S.C. §119(a) to European Patent Application No. 08100649.6 filed Jan. 18, 2008 and which are incorporated herein by reference into the present disclosure as if fully set forth herein.

FIELD OF THE INVENTION

The present invention relates to a method of communication between a transmitter and a receiver based on frames and communication node.

BACKGROUND OF THE INVENTION

The Mobile Industry Processor Interface alliance MIPI has defined a standard for chip-to-chip networks based on high-speed serial links, i.e. the Unified Protocol UniPro (www.mipi.org). The Unified Protocol UniPro relates to a general purpose protocol dealing with high-speed interconnect issues, e.g. like error handling, flow control, routing and arbitration.

The Unified Protocol UniPro may be used as a communication protocol for a digital link e.g. between the radio frequency RF chip and baseband BB chip in electronic devices with a two-chip modem solution. Such a two-chip solution is preferably used in mobile devices. The modem solution may include 802.11 modems WiFi, video on mobile TVoM or WiMAX protocols.

Within the unified protocol UniPro, error handling capabilities must be provided as for example mobile devices like mobile phones often operate in a noisy environment where various kinds of errors may occur. Such errors may include bit errors (one of the transmitted bits is inverted), burst errors (a sequence of bits is received erroneously), stuck-at errors (a sequence of bits with the same value is received), and synchronization errors (one or more bits is deleted or duplicated leading to a loss of the symbol boundary).

The error rates that may occur can be relatively high, e.g. the bit error rate of the MIPI D-Phy layer is expected to be $10^{-12}$ or in other words one bit can be erroneous in every 15 to 20 minutes. Therefore, a mechanism to recover from errors must be provided to enable a reliable communication.

In UniPro, the error handling is performed within the data link layer L2. The transmission in this layer is performed based on transmission units or frames. FIG. 1 shows a basic representation of the data frame structure according to the unified protocol UniPro. This frame comprises reserved bits RB, and a frame sequence number FSN.

In every UniPro frame, a 16-bit CRC cyclic redundancy check is provided. These CRC bits are added by the transmitter of the frame. At the receiver's side, the CRC is calculated and verified to determine whether any errors have occurred during the transmission of the frame. If the CRC received by the in the frame and computed by the receiver are the same, no errors have been detected, i.e. the transmitted and received frame correspond to each other. Furthermore, a 5-bit sequence number FSN is introduced into the frame to identify the packets. If a TC frame is transmitted, a copy of the transmitted frame is stored in a replay buffer at the transmitter's end.

The receiver will acknowledge a correct packet receipt to the transmitter by forwarding the sequence number of the frame in an Acknowledgement and Flow Control frame AFC. The structure of such an Acknowledgement and Flow Control Frame is depicted in FIG. 2. It should be noted that also multiple frames can be acknowledged at the same time if a sequence number is considered to acknowledge all frames having a sequence number equal to or less than the currently transmitted sequence number. If the transmitter has received an Acknowledgement and Flow Control Frame AFC, it can remove all frames which are being acknowledged by the AFC frame from its replay buffer.

However, if the receiver detects e.g., by means of the CRC that the received frame does not correspond to the transmitted frame, it can forward a Negative Acknowledgement Frame NAC. FIG. 3 shows a schematic representation of the structure of a Negative Acknowledgement frame NAC. The Negative Acknowledgement Frame NAC may acknowledge all correctly received frames but may signal that an error has been detected. In such a case, the receiver can remove all acknowledged frames from its replay buffer and may retransmit all unacknowledged frames.

However, it may also happen that the AFC or the NAC frames are not correctly received due to errors during the transmission over the link. It should be noted that these frames are not protected by the sequence numbers. Therefore, a mechanism must be provided such that the information with respect to the sequence number is retrieved at the data-frame transmitter side. If a frame re-transmission is initiated, the AFC frames are transmitted to update any potential miscommunication in the past. Thereafter, if no positive or negative acknowledgement has been received for a long time, a replay timer triggers a retransmission and assumes that an error has occurred in the data frame or in the transmission of the AFC frame.

Furthermore, it should be noted that the Unified Protocol UniPro allows a retransmission at almost any time, e.g. in-between frames, in the middle of a data frame, possibly pre-empting a lower-priority frame. However, a retransmission is not permitted in the middle of an AFC or NAC frame. Moreover, the Unified Protocol UniPro does not provide a mechanism in the receiver to detect a re-transmission.

In other words, a re-transmission can start at any given time and cannot be detected by the receiver, for example the receiver cannot know if it is part of a pre-emption or a frame retransmission when a frame starts. Therefore, the receiver cannot check if a correct symbol sequence is received which may lead to a delayed error detection. Furthermore, the verification of a correctness of the receiver's implementation is very difficult as transmission errors are captured only after numerous state transitions which may lead to the need for numerous and long stimulations.

SUMMARY OF THE INVENTION

It is therefore an object of the invention to provide a method of communication with an improved error handling capability.

This object is solved by a method of communication between a transmitter and a receiver according to claim 1 and a communication node according to claims 15 and 16.

Therefore, a method of communicating between a transmitter and a receiver based on frames is provided. An error detection code is added to each frame to be transmitted by the transmitter. The frames to be transmitted by the transmitter are transmitted and the transmitted frames are received by the receiver. An error detection code is re-computed based on the received frames by the receiver. At least one frame which has been correctly received based on a comparison of the error detection code of each frame with the re-computed error detection code of each received frame is acknowledged. An error indication frame is sent by the receiver when an error is detected based on the comparison result. If a re-transmission condition is detected by the transmitter by receiving an error indication frame from the receiver or if no acknowledgement frame was received by the transmitter from the receiver in a predetermined time interval, the currently transmitted frame is aborted and the transmitter inserts a trailer.

Accordingly, the possibilities for a re-transmission are restricted such that the method of communicating according to the present invention becomes easier.

According to an aspect of the invention, erroneous error detection code is inserted into a trailer of a frame by the transmitter in order to indicate a frame abortion. Therefore, the receiver can easily detect a frame abortion.

According to a further aspect of the invention, the transmitter inserts a special code into a trailer of a frame in order to indicate a frame abortion. Here, also the detection of a frame abortion by the receiver is facilitated.

According to a preferred aspect of the invention, the communication is based on a unified protocol (UniPro).

According to a further aspect of the invention, the special code for frame abortion used by the transmitter is an unused escape value according to the Unified Protocol. Hence, a value already present in the Unified Protocol can be used to indicate a frame abortion.

According to a further aspect of the invention, the special code used for frame abortion by the transmitter is an unused value of a control ID according to the unified protocol.

According to a further aspect of the invention, the currently received frame is discarded by the receiver when the receiver detects an error or an aborted frame.

According to a further aspect of the invention, each frame comprises a sequence number. The sequence number is used by the receiver to acknowledge that at least one frame is correctly received. Accordingly, the receiver can acknowledge that it has received a plurality of frames by merely using the sequence number of the last acknowledge frame. The transmitter will then know that all previously transmitted frames are correctly received.

The invention also relates to a method of communicating between a transmitter and a receiver based on frames. An error detection code is added to each frame to be transmitted to the transmitter. The frames are transmitted and received by the receiver. An error detection code is re-computed by the receiver based on the received frames. At least one frame is acknowledged which has been correctly received based on a comparison of the error detection code of each frame with the re-computed error detection frame of each received frame. An error indicating frame is sent by the receiver when an error is detected based on the comparison results. If a re-transmission condition is detected by the transmitter, for example by receiving an error indicating frame from the receiver or if no acknowledgement frame from the receiver was received by the transmitter in a predetermined time interval, the start of a retransmission of frames is indicated using a retransmission indicator. Unacknowledged frames are retransmitted.

The invention also relates to a communication node comprising a transmitting unit for transmitting frames, for inserting an error detection code to each frame. The inserting unit furthermore is adapted to detect a retransmission condition if an error indication frame has been received from a further communication node or if no acknowledgement frame has been received by the further communication node. If the retransmission condition is detected, a trailer is inserted to indicate a frame abortion and the unacknowledged frames are retransmitted.

The invention also relates to a communication node comprising a receiving unit. The receiving unit receives transmitted frames and computes an error detection code based on the received frames. The error detection code in the received frames is compared to the re-computed error detection code. If no error is detected, at least one frame is acknowledged. If an error is detected, an error indicating frame is sent.

An electronic device according to the invention may also be based on a communication of the communication nodes such that it may comprise an above transmitting unit and an above receiving unit.

The invention relates to the idea to restrict the possibilities where a re-transmission can start and/or to explicitly notify the receiver if a retransmission has started.

Further aspects of the invention are subject of the dependent claims.

BRIEF DESCRIPTION OF THE DRAWINGS

Advantages and embodiments of the invention will now be described in more detail with reference to the figures.

FIG. 1 shows a schematic representation of a frame structure in a Unified Protocol UniPro, FIG. 2 shows a schematic representation of a AFC frame structure in a Unified Protocol UniPro according to the prior art, FIG. 3 shows a basic representation of the NAC frame structure in a Unified Protocol UniPro according to the prior art, FIG. 4 shows a basic representation of a AFC frame according to the first embodiment.

DETAILED DESCRIPTION OF EMBODIMENTS

Figure 5:
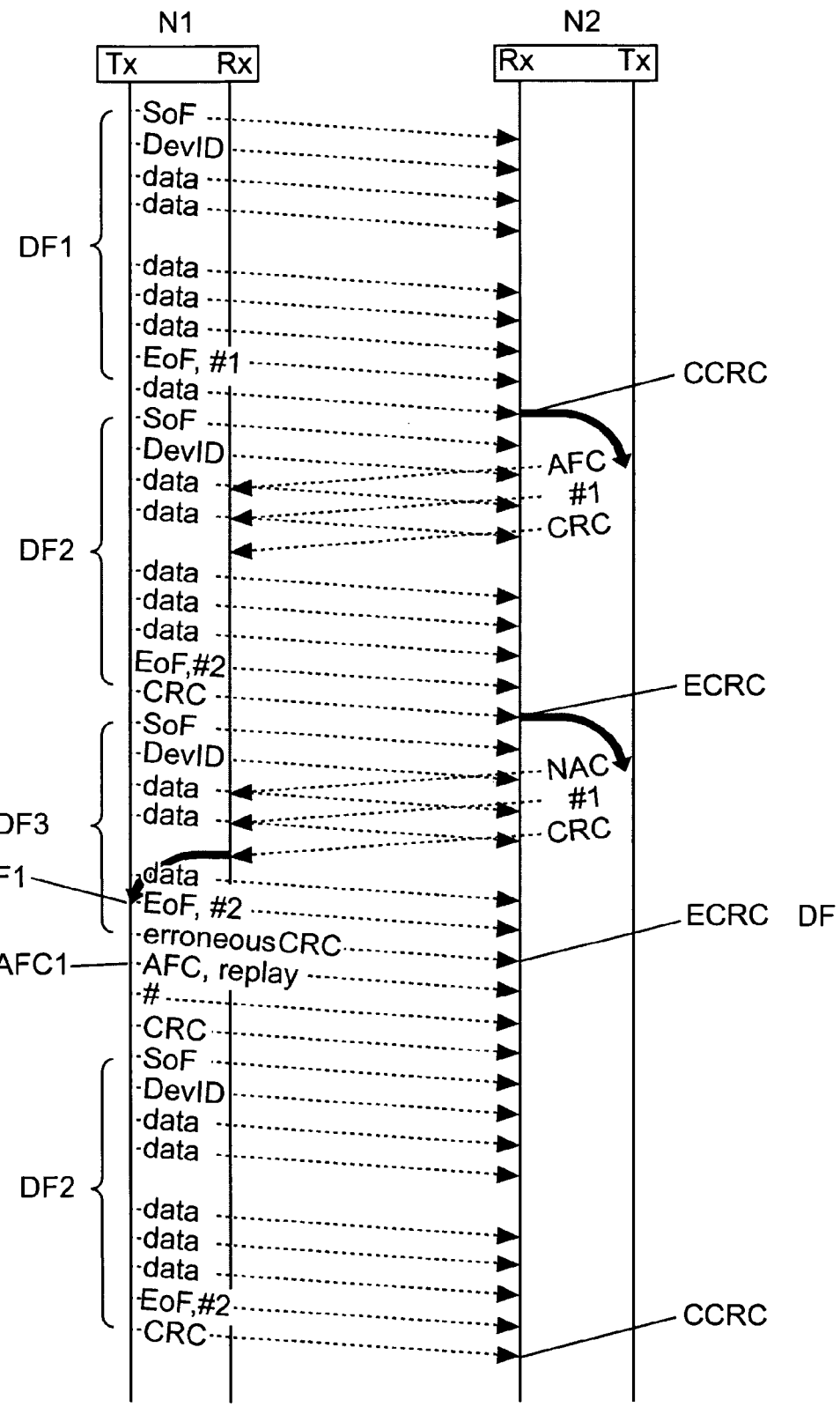
FIG. 5 shows a basic representation of a message sequence chart according to a second embodiment.

FIG. 4 shows a schematic representation of an AFC frame according to a first embodiment. The communication according to the first embodiment is based on the unified protocol UniPro designed by the Mobile Industry Processor Interface Alliance MIPI. The frame structure according to the first embodiment will enable an explicit notification of the receiver when a retransmission of data starts. The frame comprises a frame sequence number FSN, reserved bits RB and credit values CV.

To allow an early frame termination and thereby a re-transmission of a data frame, the receiver may be explicitly notified that a re-transmission is started or will be started. Such a notification may be performed by means of special line states, escape characters or bits in any existing frames.

In the Unified Protocol UniPro, AFC frames will be transmitted before a re-transmission is initiated. Accordingly, a bit in the AFC frame can be used to distinguish an AFC frame at the beginning of a re-transmission. Accordingly, the receiver only has to check for this bit in the AFC to determine whether a re-transmission is initiated. A retransmission bit RB can be used to distinguish the AFC frames. Such a retransmission bit RB may be mapped to one of the reserved bits of the AFC frame as depicted in FIG. 4.

In addition or alternatively, a second escape character ESC_DL2 or a new unused value of the CTRL_ID may be used for re-transmission.

According to a second embodiment of the invention, the points of possibilities where a re-transmission can start can be restricted to the situation when no frames are transmitted, i.e. a re-transmission may start in between two frames. On the other hand, such a solution is disadvantageous as a retransmission of data has to wait until the currently transmitted frame has been transmitted, i.e. the retransmission has to wait until the frame transmission ends.

To solve this problem, a data frame termination can be forced if a retransmission of data needs to be started.

The frame transmission can be initiated by sending an end-of-frame EOF symbol immediately without having to wait for an end-of-frame condition. Thereafter, an incorrect CRC is transmitted. This is performed to ensure that the artificially terminated data frame is discarded as the re-computed CRC of the received frame will not correspond to the CRC of the transmitter. The terminated frame may by completely discarded or may be at least partly buffered or stored until the rest of the frame is transmitted again or until a retransmission of the frame is initiated.

Alternatively, instead of transmitting an end-of-frame symbol EoF followed by an incorrect CRC, this abrupt termination of a frame can be indicated using a second escape character (ESC_DL2), or using one of the reserved values of the CTRL_ID. In both cases, a valid CRC will follow, but the receiver will know that the received data frame is only partial, and it will be discarded. It should be noted that the second escape character ESC_DL2 can be the same or different from the previously mentioned ESC_DL2 used for AFC.

FIG. 5 shows a basic representation of a message sequence chart according to a second embodiment. Here, a message exchange between a first and second node N1, N2 is depicted. Each node N1, N2 comprises a transmitter Tx and a receiver Rx. A first data frame DF1 having start of frame SoF symbol, CPortID and DeviceID symbol, several data symbols data, end of frame symbol EoF and a CRC symbol is transmitted from the first node N1 to the second node N2. As the frame is correctly received, a correct CRC CCRC is calculated and an AFC together with a CRC symbol is transmitted from the second node N2 to the first node N1. In the meantime, a second data frame DF2 is transmitted from the first node N1 to the second node N2. However, an erroneous CRC ECRC is calculated by the second node N2 and the second node N2 transmits a NAC together with a CRC to the first node N1. When the NAC from the second node N2 is received by the first node N1, the transmission of the third data frame is aborted F1, for example by intentionally introducing an erroneous CRC ECRC. When the second node N2 receives the erroneous CRC, the third frame DF3 is discarded. The first node N1 will flag an AFC and will start the replay sequence by sending the frame AFC1. Therefore, the second data frame DF2 will be re-transmitted from the first node N1 to the second node N2. If the second data frame DF2 is correctly received and a correct CRC is calculated, the second node N2 may forward an AFC.

Figure 6:
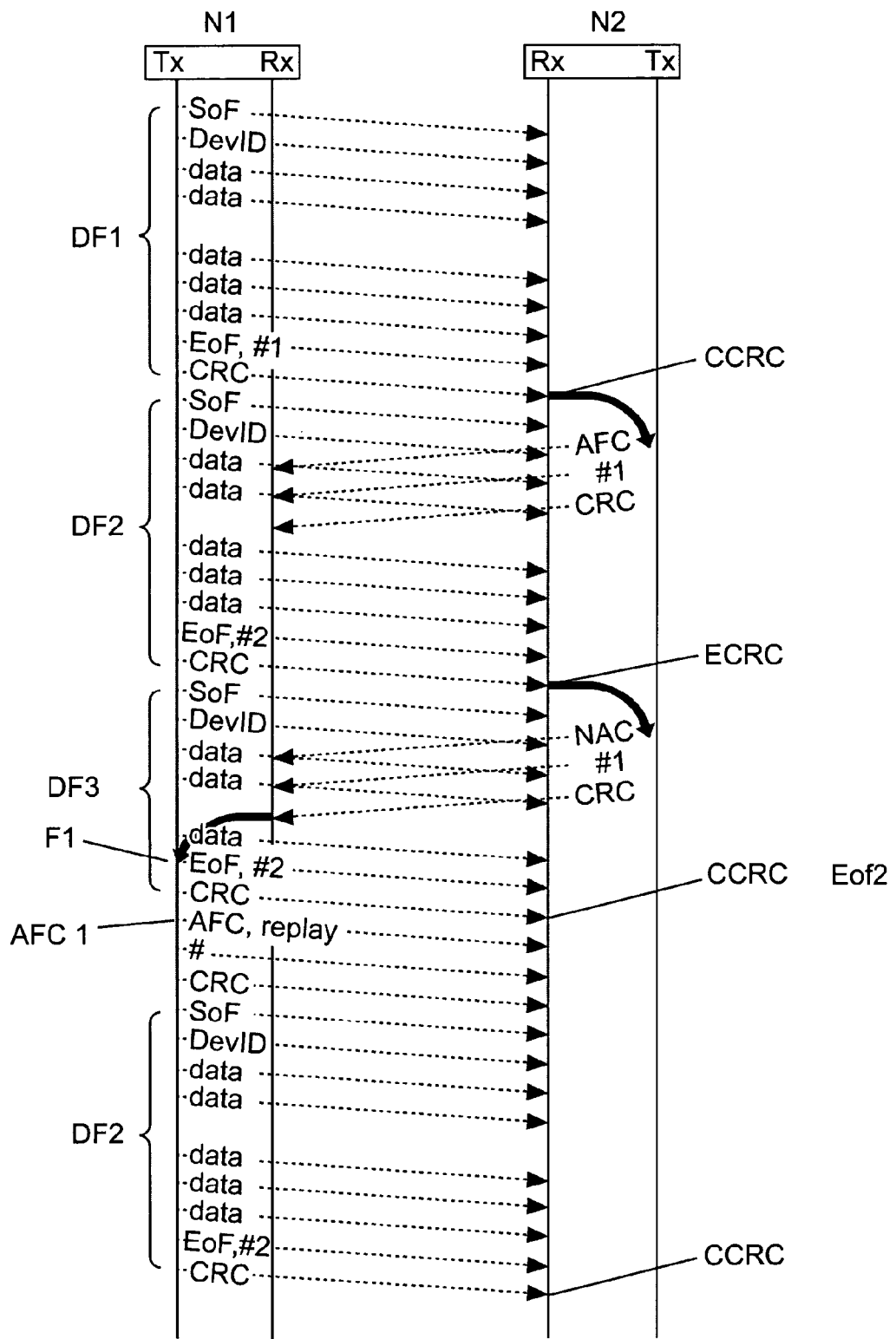
FIG. 6 shows a basis representation of a message sequence chart according to a third embodiment.

FIG. 6 shows a basis representation of a message sequence chart according to a third embodiment. The message sequence chart according to the third embodiment substantially corresponds to the message sequence chart according to the second embodiment. Therefore, a first data frame DF1 is transmitted by a first node N1 and is correctly received by a second node N2 which then forwards an AFC to the first node N1. However, if the second data frame DF2 is not correctly received by the second node N2, the second node N2 will forward a NAC to the first node N1. If the first node N1 receives a NAC, the frame which is currently being transmitted is aborted F1, abortion which is flagged to N2 using an e.g., second End Of Frame symbol EOF2. The retransmission sequence is started by an AFC frame, flagged as the beginning of a frame replay. Here, the second node N2 may receive a correct CRC CCRC but, as it receives a second end of frame symbol EoF2, the second node N2 will discard the currently received frame.

Figure 7:
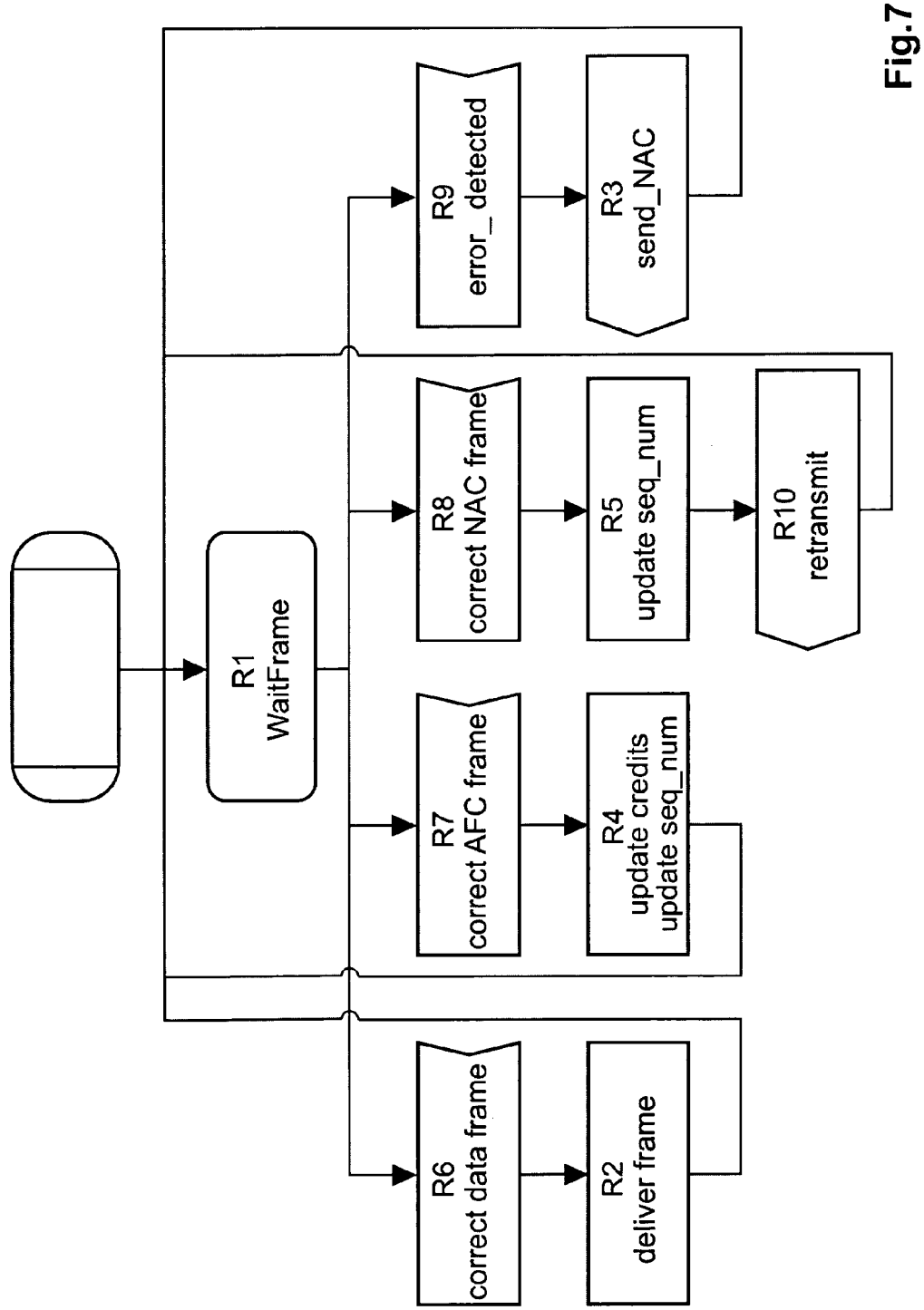
FIG. 7 shows a representation of a state machine of a receiver according to a fourth embodiment.

FIG. 7 shows a representation of a state machine of a receiver according to a fourth embodiment. In a first step R1, the receiver will wait for a frame. If a correct data frame is received in step R6, the frame is delivered in step R2. If an error is detected (Step R9), an NAC is sent in step R3. If a NAC frame is received, some of the transmitted frames may be acknowledged (Step R5), and a retransmission starts with the first unacknowledged frame in step R10. If in step R7 a correct AFC frame is received, credits in the receiver and the sequence number will also be updated in step R4.

Figure 8:
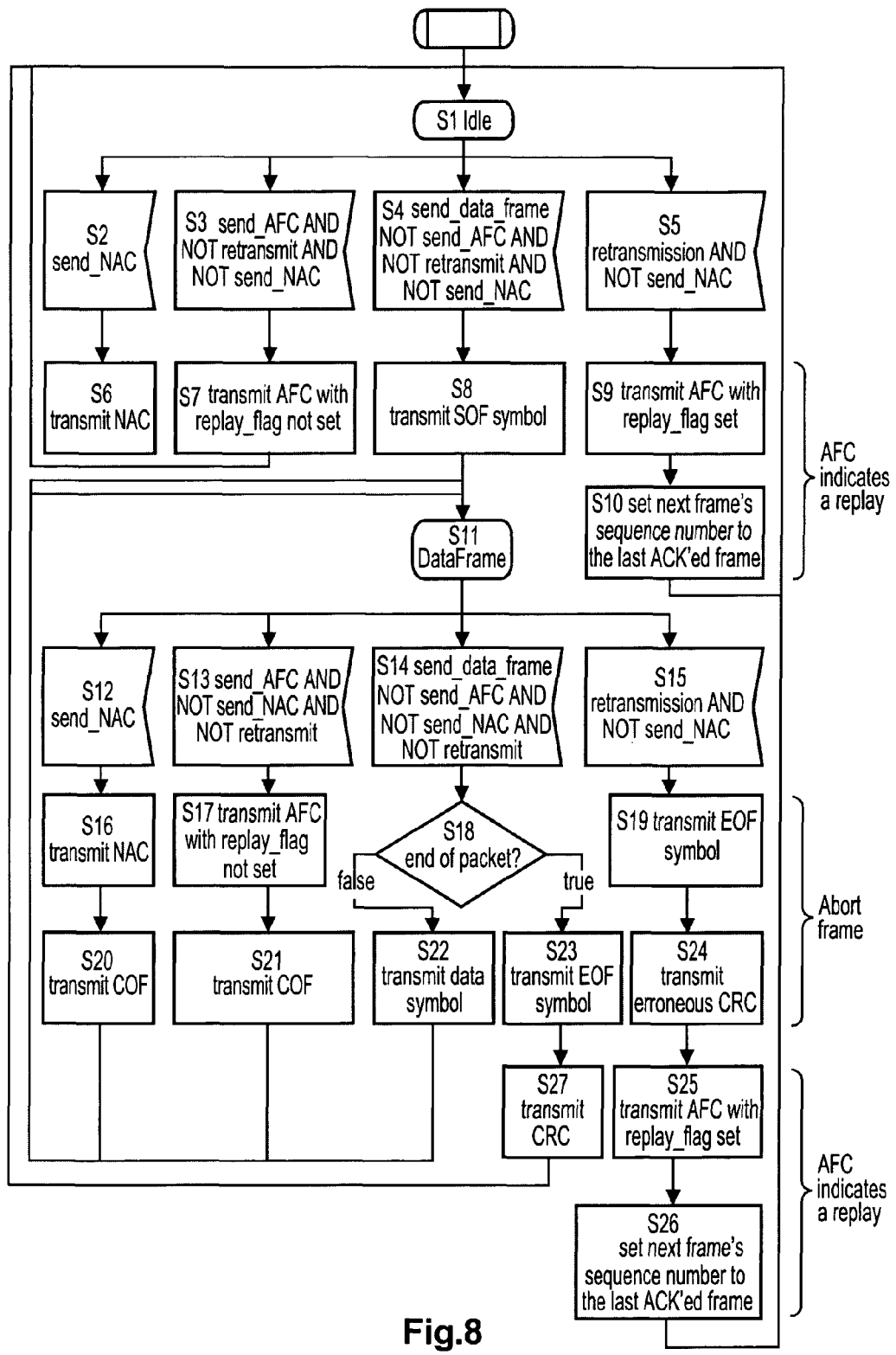
FIG. 8 shows a representation of a state machine for a transmitter according to a fifth embodiment.

FIG. 8 shows a basic representation of a state machine of a transmitter according to a fifth embodiment. In step S1, the transmitter TX is in the idle state when it is outside a frame and in the data frame state or transmission state (step S11) when it is inside a data frame transmission. When the transmitter is in the idle state, it can send frames with the following priority, namely NAC (step S2), retransmission (step S5), forwarding an AFC (step S3) and it may send a data frame (step S4). In step S3, an AFC may be send but no retransmission is initiated and no NAC is sent. In step S4, the data frames DF are sent but no AFC is sent, no retransmission is initiated and no NAC are sent. In step S5, a retransmission is initiated and no NAC is sent. If in step S2 a NAC is to be sent, the NAC will be transmitted in step S6 and the flow will return to step S1. If in step S3 an AFC is to be sent, the AFC will be transmitted in step S7 wherein a replay flag will not be set. If in step S4 a data frame is to be sent, a start of frame SoF symbol is transmitted in step S8. If in step S5 a retransmission is initiated, in step S9 an AFC is transmitted wherein the replay flag is set. Then the flow continues to step S10 where the sequence number of the next frame to the last acknowledged frame is set. Accordingly, in step S9 and S10, an AFC will indicate a replay or re-transmission of a data frame. It should be noted that a AFC and an NAC frame are not pre-emptable, accordingly they are depicted as an atomic block. However, data frames may be pre-empted by NAC or AFC frames. In the case of a link using multiple traffic classes, a data frame may also be preempted by a data frame with a higher priority. After a NAC or AFC frame, a data frame will continue with a COF symbol.

If a retransmission of a frame is required in the middle of the frame transmission, the frame will be aborted and a retransmission will start. The retransmission may also carry a retransmission indication, namely the replay flag.

If the transmitter is in the data frame state (step S11) and if a NAC is to be sent in step S12, the flow will continue to step S16 where a NAC is transmitted. Thereafter, the flow will continue to step S20 where a COF symbol is transmitted.

In step S13, an AFC is to be sent (no NAC is sent and no retransmission is initiated) the AFC is transmitted with a replay flag which is not set. Thereafter, the flow will continue to step S21 and a COF symbol is transmitted.

If in step S14 a data frame is to be transmitted (no AFC and no NAC is transmitted and no retransmission is initiated), the flow will continue to step S18 where it is determined whether the end of the packet has been reached. If the end of the packet is not present, a data symbol will be transmitted in step S22. However, if the end of packet has been reached, an EOF end of frame symbol is transmitted in step S23 and the flow will continue to step S27 where a CRC is transmitted.

If in step S15 a retransmission is initiated and no NAC is sent, the flow may continue to step S19 where an EOF end of frame symbol is transmitted. The flow will then continue to step S24 where an erroneous CRC is transmitted. Accordingly, the steps S19 and S24 will be used to abort the frame. After step S24, the flow will continue to step S25 where an AFC is transmitted wherein the replay flag is set. After step S25 the flow will continue to step S26 where the sequence number of the next frame is set to the last acknowledged frame. Accordingly, in the steps S25 and S26, the AFC is used to indicate a replay.

Figure 9:
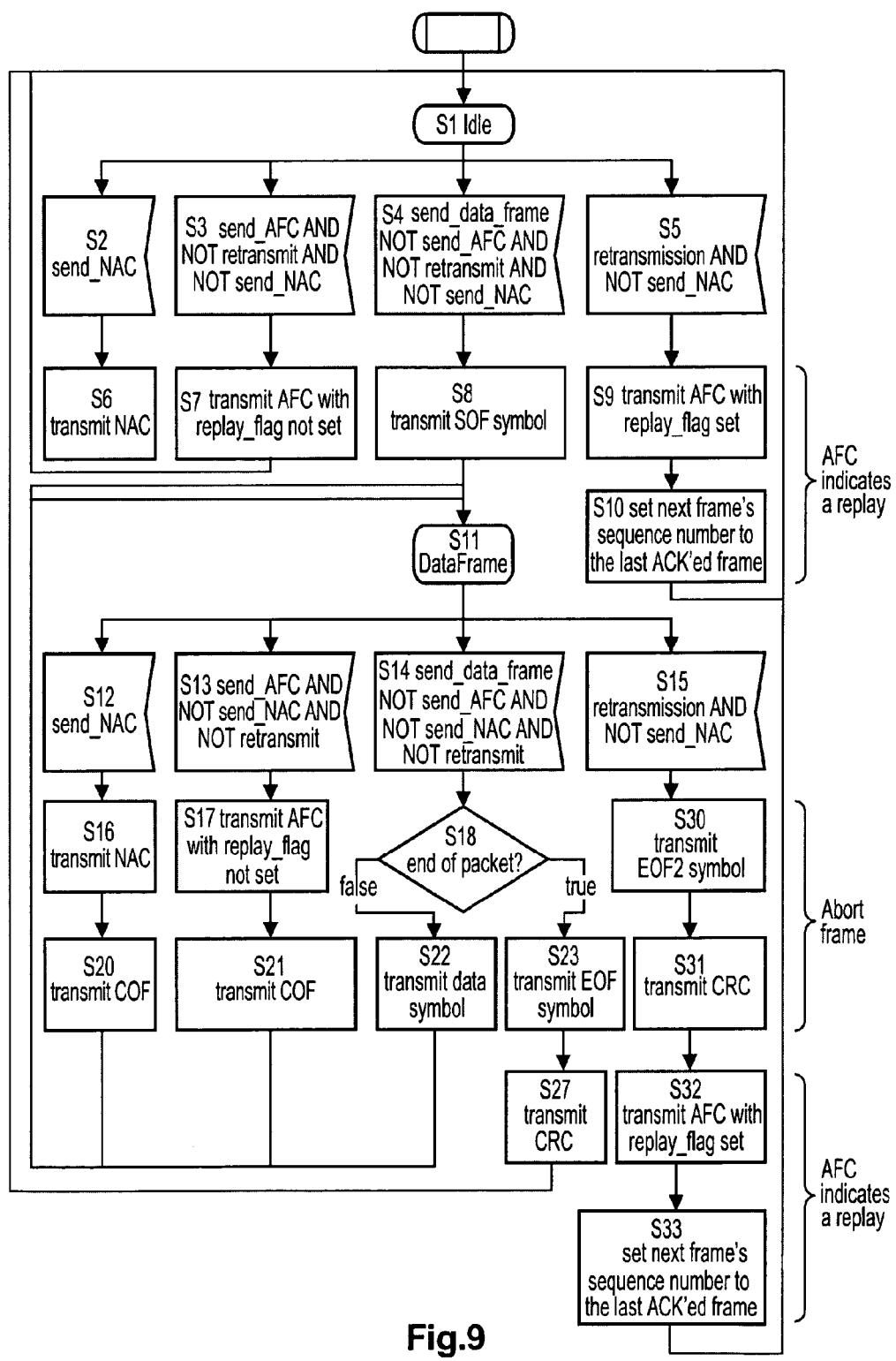
FIG. 9 shows a basic representation of a state machine for a transmitter according to a sixth embodiment.

FIG. 9 shows a basic representation of a state machine of a transmitter according to a sixth embodiment. The state machine according to the sixth embodiment substantially corresponds to the state machine according to the fifth embodiment, merely the steps S19, S24, S25 and S26 are replaced by the steps S30-S33. Accordingly, if in step S15 a retransmission is initiated, the flow will continue to step S30 where a second EOF2 end of frame symbol is transmitted. The flow will then continue to step S31 where a CRC is transmitted. Accordingly, the steps S30 and S31 will be used to abort the frame. After step S31, the flow will continue to step S32 (which substantially corresponds to the step S25 in FIG. 8). Thereafter, the flow will continue to step S33 which substantially corresponds to the step S26 in FIG. 8.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be constrained as limiting the scope of the claims.

The invention claimed is:

1. A method of operating a transmitter and a receiver based on frames, the method comprising the steps of:
adding an error detection code to each frame to be transmitted;
transmitting the frames by the transmitter; and
using an unused escape value according to a Unified Protocol to indicate that a particular frame is to be retransmitted in response to a retransmission condition, said retransmission condition determined as a function of one of (i) a recomputed error detection code of the particular frame and (ii) a predetermined time interval.

2. The method according to claim 1, comprising:
inserting an erroneous error detection code into a trailer of a frame by the transmitter to indicate a frame abortion.

3. The method according to claim 1 comprising retransmitting the particular frame.

4. The method according to claim 1, wherein the transmitter and the receiver operate based on a Unified Protocol.

5. The method according to claim 1, further comprising retransmitting the particular frame when a retransmission condition is detected.

6. The method according claim 5, wherein the operation of the transmitter and the receiver is based on a Unified Protocol.

7. The method according to claim 5, wherein a field in an acknowledgement and flow control frame is used to indicate a start of a frame retransmission.

8. The method according to claim 5, wherein, when a retransmission condition is detected by the transmitter by receiving an error-indication frame or if no acknowledgement frame was received by the transmitter in a predetermined time interval, the currently transmitted data frame is aborted by inserting a trailer, and unacknowledged frames are retransmitted.

9. A method of operating a transmitter and a receiver based on frames, the method comprising the steps of:
adding an error detection code to each frame to be transmitted;
transmitting the frames by the transmitter;
using an unused escape value according to a Unified Protocol to indicate that a particular frame is to be retransmitted in response to a retransmission condition, said retransmission condition determined as a function of one of (i) a recomputed error detection code of the particular frame and (ii) a predetermined time interval; and
aborting the particular frame by inserting a special code into a trailer of the particular frame, wherein the special code for frame abortion is an unused value of a control ID according to the Unified Protocol.

10. The method according to claim 9, further comprising:
discarding a currently received frame when the receiver detects an error or an aborted frame.

11. The method according to claim 9, wherein each frame comprises a sequence number, wherein the sequence number is used by the receiver for acknowledging that at least one frame is correctly received.

12. The method according to claim 11, wherein the sequence number is used to acknowledge a plurality of frames up to the sequence number.

13. A method of performing a communication between a transmitter and a receiver based on frames, the method comprising:
adding an error detection code to each frame to be transmitted by the transmitter;
transmitting the frames by the transmitter; and
when a retransmission condition is detected by the transmitter by at least one of:
receiving an error-indication frame, wherein the error-indication frame is indicative of an error detected based on a comparison result of the error detection code of each frame and a recomputed error detection code of each frame received by the receiver, or
not receiving an acknowledgement frame by the transmitter in a predetermined time interval, wherein the acknowledgement frame acknowledges that at least one frame was correctly received by the receiver based on the comparison result, aborting a currently transmitted frame by inserting a special code into a trailer of a frame to indicate frame abortion, wherein the special code for frame abortion is a retransmission indicator comprising at least one unused escape value, used to indicate a start of frame retransmission, and unacknowledged frames are retransmitted by the transmitter.

14. A communication node, comprising:

a transmitting unit configured to transmit a plurality of frames, configured to insert an error detection code to each frame, configured to detect a re-transmission condition when an error-indicating frame has been received from a further communication node or when no acknowledgement frame has been received from the further communication node, and configured to insert a special code into a trailer of a frame to indicate a frame abortion, wherein the special code is an unused escape value according to a Unified Protocol, and configured to retransmit unacknowledged frames.

15. An electronic device, comprising at least one communication node according to claim 14.

* * * * *